F. R. PHILLIPS.
BRAKE HANDLE.
APPLICATION FILED MAR. 30, 1911.
1,025,718.
Patented May 7, 1912.
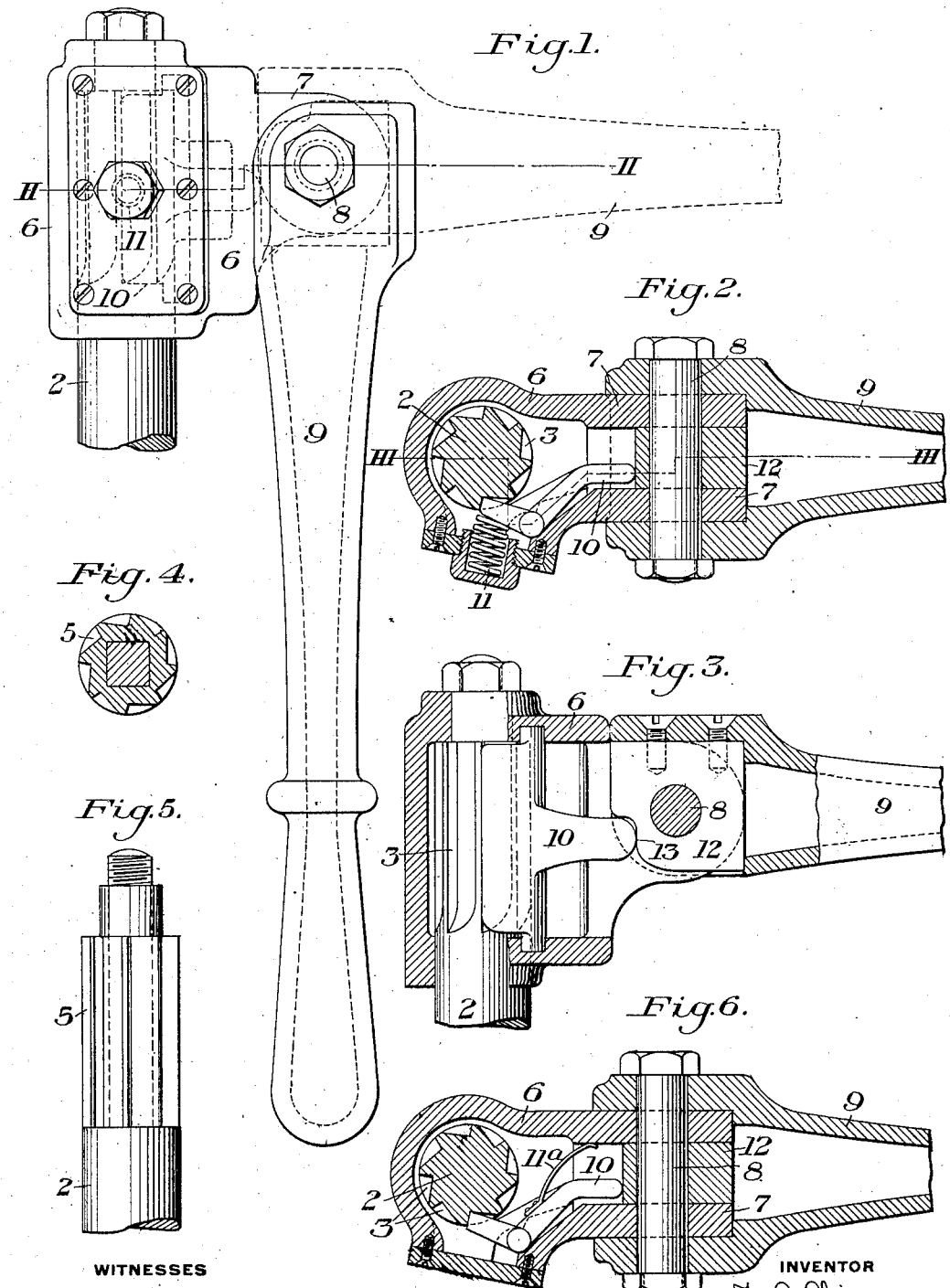
WITNESSES
R A Balderson
W Famaries
INVENTOR
F. R. Phillips,
by Bakewell, Byrnes, Parmelee.
his Attys

# UNITED STATES PATENT OFFICE.

FRANK R. PHILLIPS, OF PITTSBURGH, PENNSYLVANIA.

BRAKE-HANDLE.

1,025,718.  Specification of Letters Patent.  Patented May 7, 1912.

Application filed March 30, 1911. Serial No. 618,012.

*To all whom it may concern:*

Be it known that I, FRANK R. PHILLIPS, a resident of Pittsburgh, in the county of Allegheny and State of Pennsylvania, have invented a new and useful Improvement in Brake-Handles, of which the following is a full, clear, and exact description, reference being had to the accompanying drawings, forming part of this specification, in which—

Figure 1 is a side elevation, showing one form of my invention, the handle being shown in full lines in its normal position and a portion thereof in dotted lines in its operative position; Fig. 2 is a section on the line II—II of Fig. 1, with the handle in its operative position; Fig. 3 is a vertical section on the line III—III of Fig. 2; Fig. 4 is a sectional view showing a modified form of the brake rod ratchet; Fig. 5 is a side view of the same; and Fig. 6 is a view similar to Fig. 2, but showing a modification.

My invention has relation to brake rod handles or levers of the drop type, and is designed to provide a handle of this type which is operatively connected with the actuating pawl in such a manner that as soon as the handle is released by the hand of the operator, it will immediately fall by gravity to its vertical position, and in so doing will throw the pawl out of engagement with the ratchet on the brake rod or staff and will immediately release the brakes.

The nature of my invention will be best understood by reference to the accompanying drawings, which will now be described, it being premised, however, that various changes can be made in the details of construction and arrangement of the parts, without departing from the spirit and scope of my invention as defined in the appended claims.

In these drawings, the numeral 2 designates the upper portion of the usual brake rod or staff. At its upper end, it is provided with the usual ratchet 3, whose teeth may be either cut integral in the metal thereof, or may be formed on a separate sleeve 5, rigidly secured to the upper portion of the rod or staff proper.

6 is a casing member which surrounds the ratchet portion of the brake rod or staff and which is provided with the projecting plates or ears 7, in which is mounted the pin or shaft 8, for the drop handle 9.

10 designates a pawl lever and pawl which is pivoted in a casing member 6, and having its pawl end arranged to be forced into engagement with the teeth of the ratchet by means of a spring 11. The other arm of the pawl lever extends into position to be engaged by a cam member 12, which is secured to the handle and is arranged to turn with the handle on the pin 8. This cam member has the cam surface 13 for engagement with the arm of the pawl lever.

When the handle 9 is raised to horizontal position, the cam surface 13 is without effect upon the pawl lever and the spring 11 forces said lever into engagement with one of the ratchet teeth, as shown in Fig. 2. The handle can then be operated in the usual manner to set the brakes, the casing member 6 having a rotary movement upon the upper end portion of the brake rod or staff. As soon as the handle is released by the hand, the cam surface 13 of the cam member will engage the arm of the pawl lever and force it out of engagement with the ratchet tooth, thus giving immediate release to the brake.

In the form shown in Fig. 6, the construction and arrangement is substantially the same as in the other figures, except that instead of the spring 11 bearing against the pawl end of the pawl lever, the opposite arm of the lever is provided with a spring $11^a$.

My invention embodies all the advantages of existing brake handles of the drop type with the further advantage of effecting the release of the brake by gravity action of the handle, as soon as it is released by the hand. The entire construction is a very simple and inexpensive one and is extremely satisfactory in its operation.

While my invention has been more especially designed as a handle for brake rods, it will be readily understood that it is clearly adaptable to other purposes which employ a ratchet and pawl device operated by a handle lever.

I claim:

1. The combination with a rod or staff having ratchet teeth, a pawl lever, a spring for forcing the pawl lever into engagement with the teeth of the ratchet, and a drop brake handle having a cam portion adapted to engage the pawl lever and free the engagement of the pawl from the ratchet when the handle drops by gravity, substantially as described.

2. The combination with a brake rod or staff carrying a ratchet, a housing for the ratchet, a pawl member journaled in the housing, a spring seated in the housing and pressing the pawl into engagement with the teeth of the ratchet, and a pivoted operating lever pivoted to move vertically and to move from one position to another by gravity when released by the hand, and means operated by such movement of the lever for forcing the pawl away from the ratchet; substantially as described.

In testimony whereof, I have hereunto set my hand.

FRANK R. PHILLIPS.

Witnesses:
JOSEPH P. LARKIN,
J. N. SMITH.

Copies of this patent may be obtained for five cents each, by addressing the "Commissioner of Patents, Washington, D. C."